(12) United States Patent
Yoon

(10) Patent No.: US 12,038,960 B2
(45) Date of Patent: Jul. 16, 2024

(54) USING NEURAL NETWORKS TO DETECT INCONGRUENCE BETWEEN HEADLINES AND BODY TEXT OF DOCUMENTS

(71) Applicant: Adobe Inc., San Jose, CA (US)

(72) Inventor: Seunghyun Yoon, San Jose, CA (US)

(73) Assignee: Adobe Inc., San Jose, CA (US)

( * ) Notice: Subject to any disclaimer, the term of this patent is extended or adjusted under 35 U.S.C. 154(b) by 287 days.

(21) Appl. No.: 17/528,901

(22) Filed: Nov. 17, 2021

(65) Prior Publication Data
US 2023/0153341 A1    May 18, 2023

(51) Int. Cl.
*G06F 16/35* (2019.01)
*G06F 18/214* (2023.01)
*G06N 3/04* (2023.01)
*G06V 30/416* (2022.01)

(52) U.S. Cl.
CPC .......... *G06F 16/35* (2019.01); *G06F 18/214* (2023.01); *G06N 3/04* (2013.01); *G06V 30/416* (2022.01); *G06F 2218/12* (2023.01)

(58) Field of Classification Search
CPC .......... G06F 16/35; G06F 18/214; G06N 3/04
See application file for complete search history.

(56) References Cited

U.S. PATENT DOCUMENTS

| | | | | |
|---|---|---|---|---|
| 10,839,013 | B1* | 11/2020 | Werris | G06F 40/216 |
| 2006/0242158 | A1* | 10/2006 | Ursitti | G06Q 10/10 |
| 2015/0006512 | A1* | 1/2015 | Alfonseca | G06F 40/258 |
| | | | | 707/722 |
| 2020/0142961 | A1* | 5/2020 | Brake | G06F 40/253 |
| 2023/0026885 | A1* | 1/2023 | Singhal | G06F 40/169 |

OTHER PUBLICATIONS

Minwoo Lee, "Detecting-incongruity-gnn", Github repository, https://github.com/minwhoo/detecting-incongruity-gnn, Mar. 6, 2021. (Year: 2021).*
Media Bias/Fact Check, Available Online at: https://mediabiasfactcheck.com, Accessed from Internet on Nov. 1, 2021, 8 pages.
Chakraborty et al., Stop Clickbait: Detecting and Preventing Clickbaits in Online News Media, IEEE/ACM International Conference on Advances in Social Networks Analysis and Mining (ASONAM), Aug. 18, 2016, pp. 9-16.
(Continued)

*Primary Examiner* — Brian L Albertalli
(74) *Attorney, Agent, or Firm* — Kilpatrick Townsend & Stockton LLP

(57) ABSTRACT

An incongruent headline detection system receives a request to determine a headline incongruence score for an electronic document. The incongruent headline detection system determines the headline incongruence score for the electronic document by applying a machine learning model to the electronic document. Applying the machine learning model to the electronic document includes generating a graph representing a textual similarity between a headline of the electronic document and each of a plurality of paragraphs of the electronic document and determining the headline incongruence score using the graph. The incongruent headline detection system transmits, responsive to the request, the headline incongruence score for the electronic document.

20 Claims, 9 Drawing Sheets

(56) References Cited

OTHER PUBLICATIONS

Chen et al., XGBoost: A Scalable Tree Boosting System, In Proceedings of the 22nd ACM SIGKDD international conference on knowledge discovery and data mining, Aug. 2016, pp. 785-794.
Chesney et al., Incongruent Headlines: Yet Another Way to Mislead Your Readers, Proceedings of the EMNLP Workshop: Natural Language Processing meets Journalism, Sep. 7, 2017, pp. 56-61.
Darwish et al., Unsupervised User Stance Detection on Twitter, Proceedings of the International AAAI Conference on Web and Social Media, vol. 14, May 21, 2020, 13 pages.
Devlin et al., BERT: Pre-Training of Deep Bidirectional Transformers for Language Understanding, In Proceedings of the Conference of the North American Chapter of the Association for Computational Linguistics: Human Language Technologies, vol. 1, May 24, 2019, 16 pages.
Ecker et al., The Effects of Subtle Misinformation in News Headlines, Journal Experimental Psychology: Applied, vol. 20, No. 4, Dec. 2014, pp. 323-325.
Johnson et al., Billion-Scale Similarity Search with GPUs, Available Online at: https://arxiv.org/pdf/1702.08734.pdf, Feb. 28, 2017, 12 pages.
Kingma et al., Adam: A Method for Stochastic Optimization, International Conference on Learning Representations, Available Online at: https://arxiv.org/pdf/1412.6980v1.pdf, Dec. 22, 2014, 9 pages.
Kipf et al., Semi-Supervised Classification with Graph Convolutional Networks, Available Online at: arXiv preprint arXiv:1609.02907, Sep. 9, 2016, pp. 1-14.
Lagerwerf et al., Incongruity in News Headings: Readers' Choices and Resulting Cognitions, Journalism Practice, vol. 10, No. 6, Aug. 17, 2016, pp. 782-804, Abstract, pp. 1-3.
Mikolov et al., Advances in Pre-Training Distributed Word Representations, Proceedings of the Eleventh International Conference on Language Resources and Evaluation (LREC 2018), May 2018, pp. 52-55.
Mishra et al., Musem: Detecting Incongruent News Headlines using Mutual Attentive Semantic Matching, IEEE International Conference on Machine Learning and Applications (ICMLA), Oct. 7, 2020, 9 pages.
Pan et al., Fake News Challenge—Team SOLAT in the SWEN, Github, Available Online at: https://github.com/Cisco-Talos/fnc-1, Accessed from Internet on Nov. 2, 2021, 3 pages.
Pennington et al., GloVe: Global Vectors for Word Representation, Proceedings of the 2014 Conference on Empirical Methods in Natural Language Processing (EMNLP), Oct. 25-29, 2014, pp. 1532-1543.
Reimers et al., Sentence-BERT: Sentence Embeddings using Siamese BERT-Networks, In Proceedings of the 2019 Conference on Empirical Methods in Natural Language Processing and the 9th International Joint Conference on Natural Language Processing (EMNLP-IJCNLP), Aug. 27, 2019, 11 pages.
Riedel et al., A Simple but Tough-to-Beat Baseline for the Fake News Challenge Stance Detection Task, Available Online at: https://arxiv.org/pdf/1707.03264v1.pdf, Jul. 11, 2017, 6 pages.
Wang et al., Dynamic Graph CNN for Learning on Point Clouds, ACM Transactions on Graphics (TOG), vol. 38, No. 5, Article 146, Oct. 10, 2019, pp. 1-12.
Wei et al., Learning to Identify Ambiguous and Misleading News Headlines, Proceedings of the 26th International Joint Conference on Artificial Intelligence, Aug. 19, 2017, pp. 4172-4178.
Yoon et al., Detecting Incongruity Between News Headline and Body Text via a Deep Hierarchical Encoder, In Proceedings of the AAAI Conference on Artificial Intelligence, vol. 33, Feb. 8, 2019, 10 pages.
Yoon et al., Learning to Detect Incongruence in News Headline and Body Text via a Graph Neural Network, Institute of Electrical and Electronics Engineers Access, vol. 9, Feb. 24, 2021, pp. 36195-36206.
Zellers et al., Defending Against Neural Fake News, Advances in Neural Information Processing Systems, Oct. 29, 2019, 21 pages.

* cited by examiner

Extreme Weather Hits South Florida Coast

Extreme Weather in South Florida
Over the past two months, the South Florida coast has been subjected to weather patterns that some scientists and meteorologists have described as "extreme" and "unprecedented."

Garden Club Event Canceled
The Garden Club of Columbus, GA has announced that the 95th Annual Greenhouse Gardening Exposition scheduled for November 30, 2021 has been canceled, due to unforeseen circumstances.

Alleged Bigfoot Sighting in Brazil
A man living in the interior of the state of Sao Paulo, Brazil posted last week on various social media sites his alleged finding of a sasquatch footprint. Bigfoot enthusiasts from Brazil and abroad have been flocking to the area to see the footprint.

HEADLINE-INCONGRUENT
ELECTRONIC DOCUMENT 401
(e.g. partial representation)

Why We Should All Be Eating More Turkey

Consumption of turkey is generally restricted to special occasions and consumed less than other meats such as chicken and beef. However, a diet including turkey offers several advantages.

...

Add a few tablespoons of olive oil, a dash of salt, and a dash of pepper to each of four turkey legs. Fry the turkey legs in a pan until brown.

Spread a cup of rice on the bottom of a dish, and add, to the dish, three cups of turkey stock, lemon juice, salt, pepper, a few drops of olive oil, and the browned turkey legs.

Add the dish with the rice, turkey stock, and turkey to an oven preheated to 350 degrees fahrenheit and cook, covered in foil, for 40 minutes and then, uncovered, for 10-20 minutes. Serve hot.

HEADLINE-INCONGRUENT
ELECTRONIC DOCUMENT 402
(e.g. incorrect representation)

*FIG. 4*

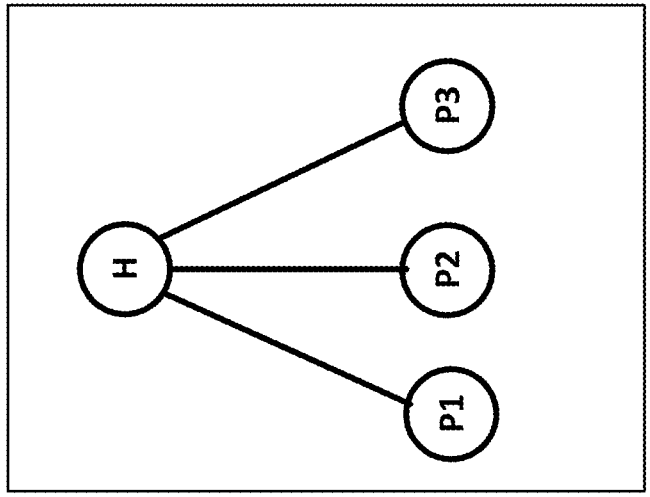
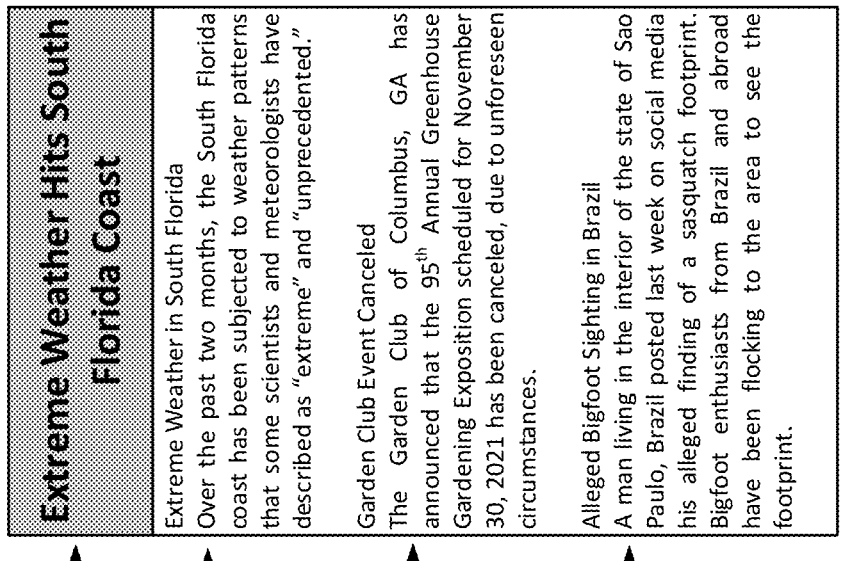
FIG. 8

US 12,038,960 B2

USING NEURAL NETWORKS TO DETECT INCONGRUENCE BETWEEN HEADLINES AND BODY TEXT OF DOCUMENTS

TECHNICAL FIELD

This disclosure generally relates to machine learning techniques for documents analysis. More specifically, but not by way of limitation, this disclosure relates to machine learning models for detection of documents having an incongruent headline.

BACKGROUND

Content provider systems that host articles or other documents can be configured to detect documents that exhibit headline incongruence, where some or all of the body text of the document does not logically correspond to the headline.

SUMMARY

The present disclosure describes techniques for using graph neural networks (GNNs) to identify documents having headline incongruence, wherein the identification can be used for modifying online computing environments or other systems. For example, an incongruent headline detection system receives a request to determine a headline incongruence score for an electronic document. The incongruent headline detection system determines the headline incongruence score for the electronic document by applying a machine learning model to the electronic document. Applying the machine learning model to the electronic document comprises generating a graph representing a textual similarity between a headline of the electronic document and each of a plurality of paragraphs of the electronic document and determining the headline incongruence score using the graph. The incongruent headline detection system transmits, responsive to the request, the headline incongruence score for the electronic document.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 depicts an example illustrations of headline-incongruent electronic documents, according to certain embodiments disclosed herein.

FIG. 8 depicts an example illustration of a headline-incongruent electronic document and of a graph representing the headline-incongruent electronic document, according to certain embodiments disclosed herein.

DETAILED DESCRIPTION

Figure 1:
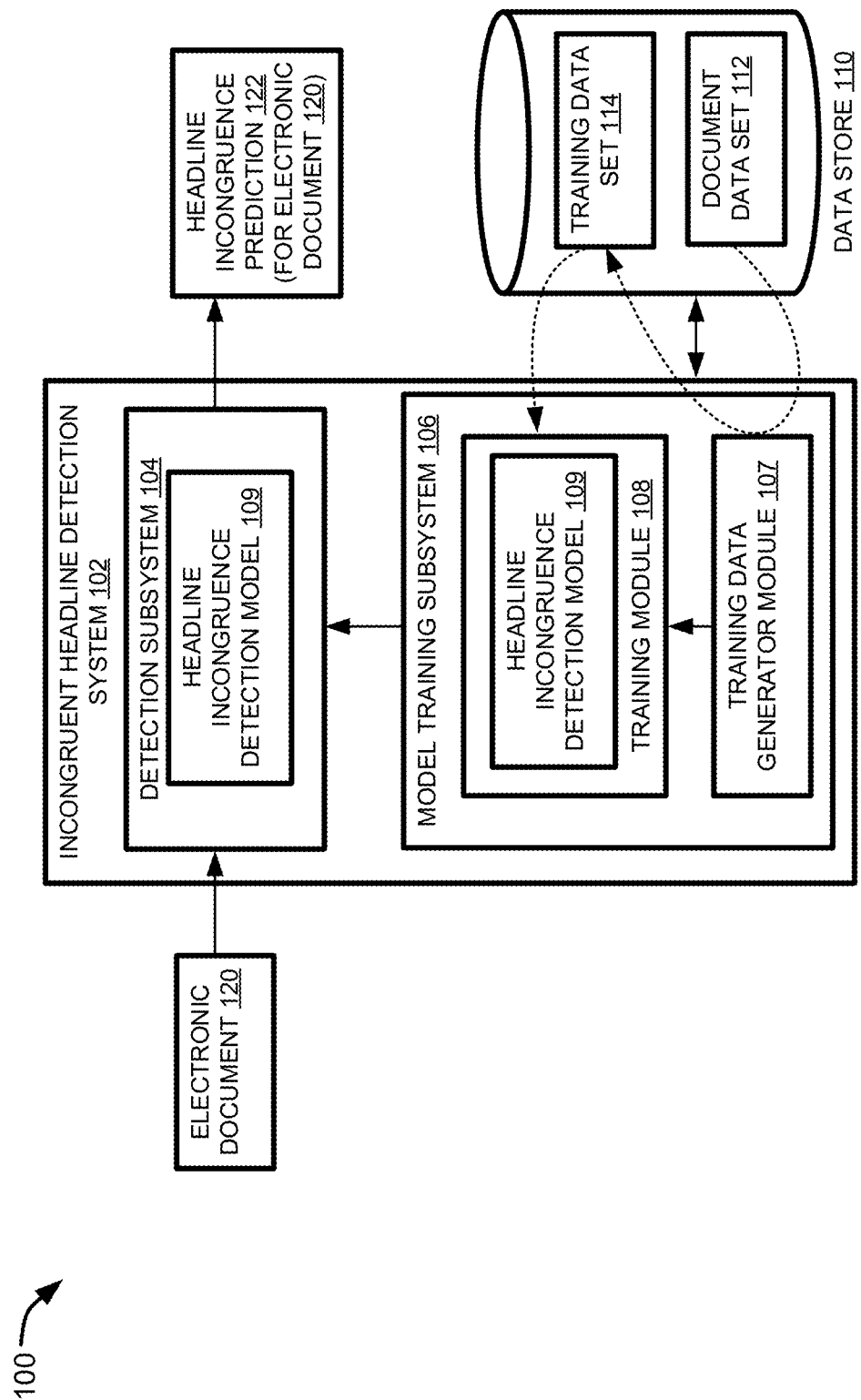
FIG. 1 depicts an example of a computing environment for determining a headline incongruence prediction for an electronic document, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional models for detecting headline incongruence in documents focus on learning a relationship between a headline and the whole of the body text. For example, conventional models may learn characteristics of the document headline and a body text jointly via a neural network. However, since body texts of documents can be thousands of words in length, conventional models provide less-accurate predictions of headline incongruence due to increased content complexity that occurs as a length of the document is increased. Also, conventional models for detecting headline incongruence in documents are trained using document data sets that are manually annotated using ground truth labels. However, manually annotating each document of a data set (e.g. with a headline congruent label or a headline-incongruent label) practically limits a size of a training data set, which decreases an accuracy of headline incongruence predictions generated by conventional models.

Certain embodiments described herein address the limitations of conventional systems by providing a machine learning model to automatically identify documents that exhibit an incongruence between a headline text and a body text (a headline incongruence), wherein the identification can be used for modifying online computing environments or other systems. Certain embodiments described herein improve the performance of automated document classification systems by, for example, determining a headline incongruence prediction for an electronic document based on a textual similarity between each paragraph of the electronic document to a headline of the electronic document. Thus, the prediction of the graph-based model approach described herein can be more accurate or useful than those provided by conventional solutions, particularly as the body text length of documents is increased. Further, certain embodiments described herein address the limitations of conventional systems by providing a method to automatically generate a training data set of documents that are labeled with ground truth labels, which increases a size of a training data set that can be used for training a headline incongruence prediction model, which provides for predictions that are more accurate than those provided by conventional solutions, which rely on manually-annotated training document sets.

The following non-limiting example is provided to introduce certain embodiments. In this example, an incongruent headline detection system implementing a headline incongruence detection model (e.g. a graph-based hierarchical dual encoder network) receives input data including an electronic document. The incongruent headline detection system implementing the headline incongruence detection model determines a headline incongruence prediction for the electronic document that describes a level of incongruence between the headline and body text of the electronic document. For example, the incongruent headline detection system receives an electronic document (e.g. a news article) and a request for a headline incongruence prediction (e.g. a headline incongruence score or a headline incongruence label) for the electronic document. The electronic document includes a headline text and a body text that includes a number of paragraphs.

The incongruent headline detection system applies a headline incongruence detection model to the input electronic document to determine a headline incongruence prediction for the input electronic document. In some embodiments, the headline incongruence prediction includes a headline incongruence score that describes a degree of headline incongruence of the document. In some embodiments, the headline incongruence prediction includes a headline incongruence label. In some embodiments, the headline incongruence detection model determines a headline incongruence prediction for each paragraph of the document and determines the headline incongruence prediction for the document based on the paragraph-specific headline incongruence predictions. For example, the headline incongruence prediction for the document is a function of the paragraph-specific headline incongruence predictions.

In some examples, the headline incongruence detection model includes a hierarchical dual encoder, an edge learning model, a feature propagation model, and an incongruity prediction model. The hierarchical dual encoder is configured to determine, for each of the headline (i.e. the headline text) and the paragraphs (i.e. the respective paragraph texts), a respective hidden state. The edge learning model is configured to determine a textual similarity between the headline and each of the paragraphs of the electronic document. The edge learning model is configured to determine edge weights between the headline and each of the paragraphs, the edge weights representing a textual similarity between the headline and each of the paragraphs. The feature propagation model is configured to generate a graph for the headline and the paragraphs of the electronic document based on the hidden states and the textual similarities. The graph includes a headline node associated with the headline of the electronic document, a set of paragraph nodes associated with the paragraphs of the electronic document, and edges connecting the headline node to each paragraph node of the graph. The feature propagation model assigns, to the headline node and each of the paragraph nodes, the hidden states associated with the headline and paragraphs as determined by the hierarchical dual encoder. The feature propagation model further assigns, to each edge connecting the headline node to a respective paragraph node, the edge weight determined by the edge learning model that represents the textual similarity between the respective paragraph (associated with the respective paragraph node) and the headline (associated with the headline node). The feature propagation model iteratively applies a feature propagation algorithm on the graph to propagate node features (e.g., hidden states) into neighboring nodes of the graph according to the graph structure (e.g., connections defining edge weights between nodes). Based on the headline node features and paragraph node features of the updated graph, the incongruity prediction model determines an incongruence prediction for each of the paragraphs of the electronic document. The incongruity prediction model determines overall headline incongruence prediction for the electronic document based on the headline incongruence predictions for each of the paragraphs. For example, the overall headline incongruence prediction can be determined as a linear or non-linear function of the headline incongruence predictions for each of the paragraphs.

Continuing with this example, the incongruent headline detection system transmits the headline incongruence prediction (e.g. score or label) predicted by the headline incongruence detection model for the electronic document to the system from which the request to determine the headline incongruence prediction was received. In some embodiments, the headline incongruence detection system, or the system to which the headline incongruence prediction is transmitted, modifies features of an online computing environment based on the prediction of headline incongruence by the headline incongruence detection model for one or more electronic documents. In some instances, modifying the features of the online computing environment include deleting, limiting access to, labeling, or otherwise performing an action with respect to the electronic document associated with the headline incongruence prediction.

In certain embodiments, during a training phase, the headline incongruence detection model is trained to generate a headline incongruence prediction for an electronic document. In an example, the training data used for the training includes a set of headline-congruent documents. The headline incongruence detection system may generate a set of headline-incongruent documents based on the set of headline-congruent documents. In an example, to generate a headline-incongruent document, the headline incongruence detection system retrieves a first headline-congruent document. The first headline-congruent document has a headline and paragraphs. The headline incongruence detection system retrieves a second headline-congruent document that has a headline and paragraphs. The headline incongruence detection system replaces, in the first headline-congruent document, one or more paragraphs with one or more paragraphs from the second headline-congruent document. In this example, the headline-incongruent document includes the original headline of the first headline-congruent document, one or more paragraphs of the second headline-congruent document that replaced paragraphs of the first-headline congruent document, and remaining paragraphs of the first headline-congruent document that were not replaced with paragraphs from the second headline-congruent document. In some instances, the training data includes the set of headline-congruent documents and the generated set of headline-incongruent documents.

In certain embodiments, multiple loss functions are used for training the graph-based neural network. In some instances, the multiple loss functions include a headline incongruence loss function used to minimize an error between generated document-level headline incongruence prediction and ground truth values. In some instances, the headlines and paragraphs in the headline-incongruent documents of the set of training data are labeled so that the headline incongruence detection system can log which paragraphs in a training document are congruent to the headline of the training document. In some instances, the multiple loss functions include an edge loss function providing feedback for determining, by the edge learning model, edge weights between the headline hidden state and each of the paragraph hidden states. In some instances, the edge loss function guides the edge learning model in learning edge weights such that edges of headline-congruent paragraphs are retained and edges of headline-incongruent paragraphs are masked. In some instances, a combined loss function is constructed as a function of the multiple loss functions and is used to train the headline incongruence detection model.

The headline incongruence detection model that generates headline incongruence predictions for electronic documents, described herein, provides several improvements and benefits over conventional techniques. In contrast to conventional techniques discussed above that focus on comparing a body text of a document as a single unit to a headline of the document, the headline incongruence detection model described herein enables a more accurate prediction of headline incongruence. This higher accuracy is achieved by considering a headline congruence for each paragraph of the body text, whereas conventional techniques do not consider a paragraph-level headline incongruence. Also, the headline incongruence detection model, as described herein, is more accurate than conventional systems, because it includes constructing a graph structure of the document to enable feature propagation between a headline node and the paragraph nodes, which are each connected to the headline node. The propagation of features between paragraph nodes and the headline node provides for a prediction of headline incongruence with greater accuracy when compared to conventional systems. Further, the headline incongruence detection model described herein provides for predictions with greater accuracy over conventional systems due to its improved training. The headline incongruence detection model described herein can be trained on an automatically generated set of headline-incongruent electronic documents from a set of headline-congruent electronic documents. This training data provides headline incongruence predictions of greater accuracy over conventional systems, which rely on training data sets including documents must first be manually labeled.

As used herein, the term "headline congruence" is used to refer to a correspondence, based on a textual similarity, between a headline, title, or other principal section of an electronic document and other text of (e.g., the whole body text or a paragraph thereof) the electronic document that is not part of the principal section. Accordingly, as used herein, the term "headline-congruent electronic document" is used to refer to an electronic document in which a correspondence exists between the headline and one or more other text of the electronic document and the term "headline-incongruent electronic document" is used to refer to an electronic document in which a correspondence does not exist between a headline and one or more other text of the electronic document. One example of a headline-incongruent electronic document is an electronic document in which the headline of the electronic document makes claims that only partially represent a story represented in the body text of the electronic document. Another example of a headline-incongruent electronic document is an electronic document in which the headline of the electronic document is distinct from a main story recited in the body text of the electronic document.

Example Operating Environment for Determining Headline Incongruence Predictions for Electronic Documents Referring now to the drawings, FIG. 1 depicts an example of a computing environment 100 for determining, by an incongruent headline detection system 102, a headline incongruence prediction 122 for an electronic document 120. The computing environment 100 includes an incongruent headline detection system 102, which can include one or more processing devices that execute a detection subsystem 104 for applying a headline incongruence detection model 109 to an electronic document 120 to determine a headline incongruence prediction 122 for the electronic document 120. The one or more processing devices of the incongruent headline detection system 102 can further execute a model training subsystem 106 for training, using a training module 108 of the model training subsystem 106, the headline incongruence detection model 109 that is used for generating the headline incongruence prediction 122. The model training subsystem 106 can further generate, using a training data generator module 107 and from a document data set 112, a training data set 114 for use by the training module 108 to train the headline incongruence detection model 109. The document data set 112 could be a set of headline-congruent electronic documents, for example, a set of news articles from a reputable news publisher. The training data set 114 is a set of headline-incongruent electronic documents generated from the headline-congruent document data set 112. The computing environment 100 further includes a data store 110 for storing data used in the determination of the headline incongruence prediction 122, such as the training data set 114 and the document data set 112.

The detection subsystem 104 and the model training subsystem 106 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the incongruent headline detection system 102 can be implemented using more or fewer systems or subsystems than those shown in FIG. 1, may combine two or more subsystems, or may have a different configuration or arrangement of the systems or subsystems.

The detection subsystem 104 is configured to receive or otherwise access an electronic document 120. In some instances, the electronic document 120 may be provided to the detection subsystem 104 by another system (e.g. a search system, a content provider system, a social network system). In some instances, the detection subsystem 104 receives a request to determine a headline incongruence prediction 122 for the electronic document 120 along with the electronic document 120. In some instances, the detection subsystem 104 receives the request to determine a headline incongruence prediction 122 along with an identifier (e.g. a publication number, a web address, or other identifier) identifying an electronic document 120. The detection subsystem 104 can retrieve, responsive to receiving the request, the electronic document 120 associated with the identifier from a database. The electronic document 120 includes a headline text as well as a plurality of paragraph texts. The headline text may be a text of a principal section of the document (e.g., a title text) or may be a hyperlink text of a hyperlink via which the electronic document 120 may be accessed. In some instances, the electronic document 120 includes an article.

To generate the headline incongruence prediction 122, the detection subsystem 104 employs a headline incongruence detection model 109. Additional details about generating the headline incongruence prediction 122 by applying a trained headline incongruence detection model 109 are provided below with respect to FIG. 2.

The incongruent headline detection system 102 generates and trains the headline incongruence detection model 109 using the model training subsystem 106. The model training subsystem 106 builds and trains the headline incongruence detection model 109. In FIG. 1, the model training subsystem 106 includes a training data generator module 107 and a training module 108.

The training data generator module 107 is configured to generate a training data set 114 from a document data set 112. For example, the training data generator module 107 accesses the document data set 112, which includes a set of electronic documents known to be headline-congruent (e.g., from a source, such as a reputable news website, known to publish electronic documents that are headline-congruent), and generates a set of headline-incongruent electronic documents by mixing paragraphs and headlines of the electronic documents in the document data set 112. In some instances, the training data set 114 includes the generated set of headline-incongruent electronic documents. In some instances, the training data set 114 includes both the generated set of headline-incongruent electronic documents and the set of headline-congruent electronic documents (the document data set 112). In some instances, the training data generator module 107 labels the paragraphs of the headline-incongruent electronic documents as either headline-congruent (if the paragraph was originally in the electronic document) or non-headline-congruent (if the paragraph was originally in another electronic document and was moved to the current electronic document during generation of the training data set 114).

The training module 108, using the training data set 114, trains the headline incongruence detection model 109 to minimize one or more loss functions. Additional details of generating and training a headline incongruence detection model 109 is described in FIG. 3. In various examples, the training data generator module 107 and the training module 108 can be implemented as one or more of program code, program code executed by processing hardware (e.g., a programmable logic array, a field-programmable gate array, etc.), firmware, or some combination thereof.

Figure 2:
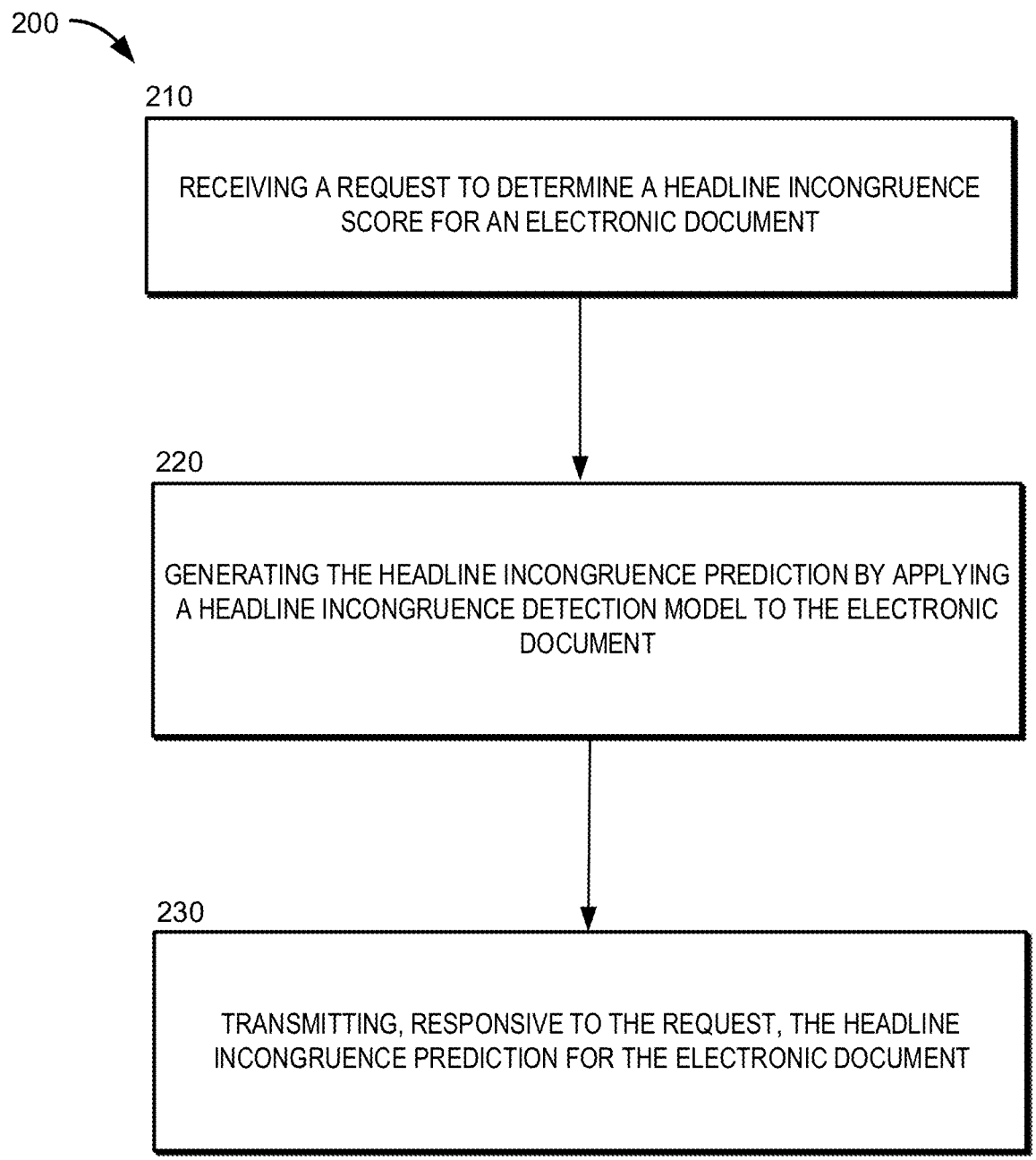
FIG. 2 depicts an example of a process for determining a headline incongruence prediction for an electronic document, according to certain embodiments disclosed herein.

Examples of Computer-Implemented Operations for Determining Headline Incongruence Predictions for Electronic Documents FIG. 2 depicts an example of a process for using a headline incongruence detection model 109 to generate a headline incongruence prediction 122 for an electronic document 120. One or more computing devices (e.g., the incongruent headline detection system 102 or the individual modules contained therein) implement operations depicted in FIG. 2. For illustrative purposes, the process 200 is described with reference to certain examples depicted in the figures. Other implementations, however, are possible.

At block 210, the method 200 involves receiving a request to determine a headline incongruence prediction 122 for an electronic document 120. For example, the incongruent detection subsystem 104 receives an electronic document 120 and a request for a headline incongruence prediction 122 for the electronic document. The electronic document 120 includes a headline text and a body text (e.g., text of the document that is not part of the headline). The body text includes a plurality of paragraphs. In some instances, the headline text includes a text displayed in a link on a website, where selection of the link would cause the electronic document 120 to be displayed via a computing device of a viewer of the document who selects the link using the computing device. In some instances, the incongruent detection subsystem 104 receives the electronic document 120 and the request from a search system, a content provider system (e.g. a news article aggregator website, a social media system, etc.), a document database system, or other system interested in the headline incongruence prediction 122 for the electronic document 120. In some instances, the incongruent detection subsystem 104 periodically scans a document database of a system (e.g. a search system, content provider system, or other interested system) to retrieve electronic documents 120 and provide headline incongruence predictions 122 for the retrieved electronic documents 120 to the system associated with the document database.

At block 220, the method 200 involves generating the headline incongruence prediction 122 by applying a headline incongruence detection model 109 to the electronic document 120. In some embodiments, the headline incongruence prediction 122 is a headline incongruence score that describes a degree of headline incongruence of the electronic document 120. For example, the score is a value between 0 and 1, wherein a value closer to 0 is more headline-incongruent than a value farther away from 0 and wherein a value closer to 1 is more headline-congruent than a value farther away from 1. In some embodiments, the headline incongruence prediction 122 is a headline incongruence label. For example, the label is either is a headline-congruent label identifying the electronic document 120 as being headline-congruent or is a headline-incongruent label identifying the electronic document 120 as being headline-incongruent. In some embodiments, the headline incongruence detection model 109 determines a headline incongruence prediction 122 for each paragraph of the electronic document 120 and determines the headline incongruence prediction 122 for the electronic document 120 based on the paragraph-specific headline incongruence predictions. For example, the headline incongruence prediction 122 for the electronic document is a function of the paragraph-specific headline incongruence predictions. For example, the function may be an average, a weighted average, a maximum, a mode, a median, or other function of the paragraph-specific headline incongruence predictions.

At block 230, the method 200 involves transmitting, responsive to the request, the headline incongruence prediction 122 for the electronic document 120. For example, the detection subsystem 104 transmits the headline incongruence prediction 122 (e.g. a score or label) to the electronic document 120 to the system from which the request to determine the headline incongruence prediction 122 was received. In some embodiments, the detection subsystem 104, or the system to which the headline incongruence prediction 122 is transmitted, modifies features of an online computing environment based on the prediction of headline incongruence by the headline incongruence detection model 109 for the electronic document 120.

In some instances, modifying the features of the online computing environment include deleting, limiting access to, labeling, or otherwise performing an action with respect to the electronic document 120 associated with the headline incongruence prediction 122. For example, the detection subsystem 104 or the system to which the headline incongruence prediction 122 is transmitted compares the headline incongruence prediction 122 against a threshold value, if the headline incongruence prediction 122 is greater than the threshold value, the, the detection subsystem 104 or the system deletes or otherwise restricts access to the electronic document 120. In some instances, labeling the document could include displaying, via a user interface of a user device in response to receiving a hover input or clicking input with respect to a link to the electronic document 120, a warning label alerting the user that the electronic document 120 is headline-incongruent. For example, the label reads "this text of this document/article has been determined potentially to be irrelevant to the headline," "the quality of this article is predicted to be low," or other text that alerts the user that the electronic document 120 exhibits headline incongruence, in accordance with the headline incongruence prediction 122.

Figure 3:
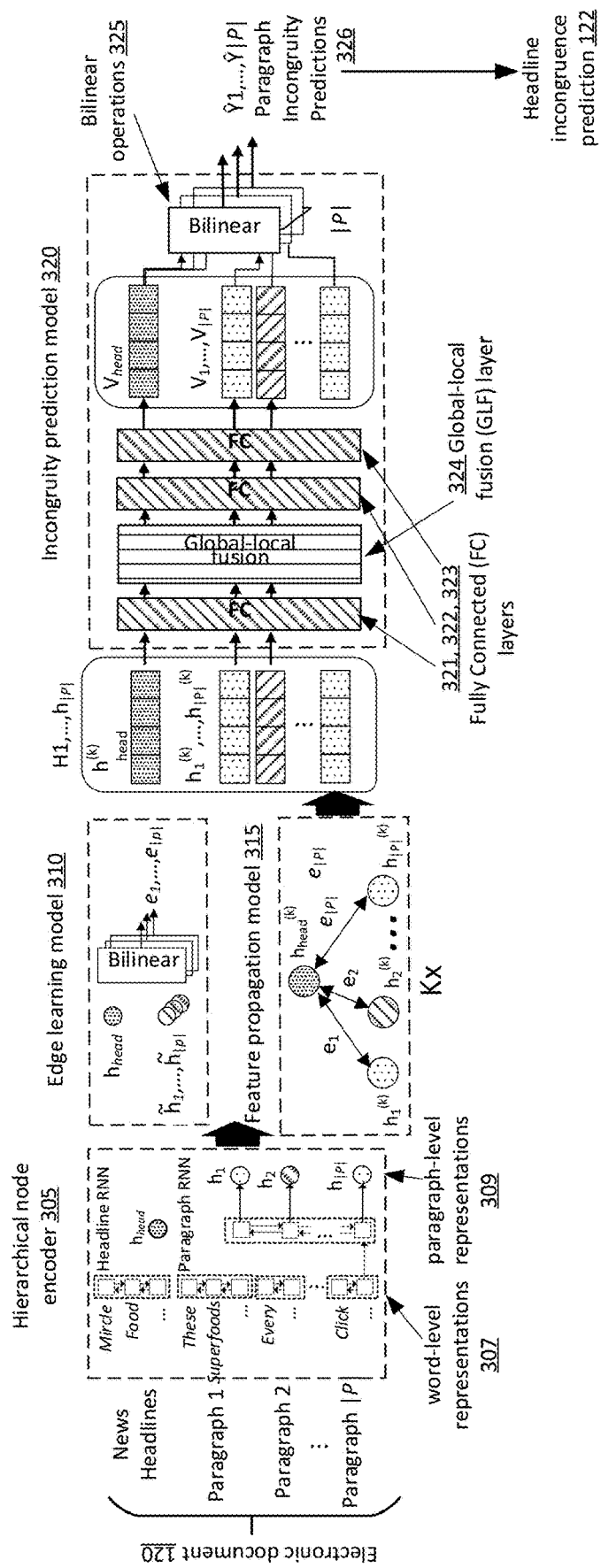
FIG. 3 depicts an example illustration of a headline incongruence detection model for implementing certain embodiments disclosed herein.

FIG. 3 depicts an illustration of a headline incongruence detection model 109 for use in certain embodiments described herein, for example as described in FIG. 1 and FIG. 2. As depicted in FIG. 3, the headline incongruence detection model 109 includes a hierarchical dual encoder 305, an edge learning model 310, a feature propagation model 315, and an incongruity prediction model 320. A process for training the headline incongruence detection model 109 is described in FIG. 5. In certain examples, the headline incongruence detection model 109 receives an electronic document 120, which, in some instances, may be a news article including a news headline and P paragraphs, as depicted in FIG. 3. In the example depicted in FIG. 3, the news headline includes a text "Miracle food . . . ," paragraph 1 of the P paragraphs starts with a text "These superfoods . . . ," paragraph 2 of the P paragraphs starts with a text "Every . . . ," and paragraph P of the P paragraphs starts with a text "Click . . . ."

The hierarchical dual encoder 305 determines, for each of the headline and the P paragraphs of the electronic document 120, a respective hidden state, which are depicted in FIG. 3 as $h_{head}$, $h_1$, $h_2$, . . . $h_P$. In some instances, the hierarchical dual encoder model 305 applies one or more recurrent neural networks (RNNs) to headline text and texts of each of the plurality of paragraphs, which are input to the RNN as word sequences, to determine the hidden states. In some embodiments, as depicted in FIG. 3, a Headline RNN determines a headline hidden state $h_{head}$, based on the headline text of the electronic document 120 and a Paragraph RNN determines paragraph hidden states $h_1$, $h_2$, . . . $h_P$. for each of the P paragraphs of the electronic document 120. In some embodiments, the Headline RNN includes a gated-recurrent-unit-based (GRU-based) bidirectional RNN to which word sequences for the headline is input to encode the input into a fixed-size vector. Based on the input word sequences for the headline, the GRU-based bidirectional Headline RNN outputs a respective final hidden state for the headline, as depicted in FIG. 3. In some embodiments, the Paragraph RNN includes a GRU-based bidirectional RNN to which world-level representations 307 (word sequences) for each of the P paragraphs are input to determine a last hidden state of the GRU-based bidirectional RNN as a paragraph-level representation 309 of each paragraph. The GRU-based bidirectional RNN then learns the paragraph representation ($h_1$, $h_2$, . . . $h_P$) from the first level of the GRU-based bidirectional RNN and the context-aware paragraph-level representations 309. In some instances, the hierarchical dual encoder model 305 applies one or more neural networks that include sequential models capable of sequential encoding (e.g. transformer neural networks) to headline texts and to texts of each of the plurality of paragraphs, which are input to the neural networks as word sequences, to determine the hidden states. In certain embodiments, a Headline transformer neural network determines the headline hidden state $h_{head}$, based on the headline text of the electronic document 120 and a Paragraph transformer neural network determines the paragraph hidden states $h_1$, $h_2$, . . . $h_P$. for each of the P paragraphs of the electronic document 120.

The edge learning model 310 determines a textual similarity between the headline and each of the P paragraphs of the electronic document 120. The edge learning model determines edge weights ($e_1$ . . . $e_P$) between the headline and each of the P paragraphs, the edge weights representing a textual similarity between the headline and each of the P paragraphs. In an embodiment, each respective edge weight is determined as a function of the hidden states of the headline and the respective paragraph. In this embodiment, the function may be a bilinear operation with sigmoid nonlinearity, for example, $$e_i = \sigma(h_{head}^T W_E \bar{h}_i + b_E), \quad (1)$$

where $W_E$ and $b_E$ weights determined through training, $\bar{h}_i$ is the hidden state of the respective paragraph, and $h_{head}$ is the hidden state of the headline. The use of a sigmoid function bounds the edge weight to a value between zero and one.

The feature propagation model 315 generates a graph for the headline and the P paragraphs of the electronic document 120 based on the hidden states of the headline and the paragraphs. The graph includes a headline node associated with the headline of the electronic document 120, P paragraph nodes associated with the P paragraphs of the electronic document 120, and edges connecting the headline node to each paragraph node of the graph. The feature propagation model 315 assigns, to the headline node and each of the P paragraph nodes, the hidden states associated with the headline and P paragraphs as determined by the hierarchical dual encoder 305. The feature propagation model 315 assigns, to each edge connecting the headline node to a respective paragraph node, a respective edge weight. The respective edge weight represents the textual similarity between the respective paragraph associated with the respective paragraph node and the headline associated with the headline node. In some embodiments, edges connecting paragraphs having a greater headline congruency were assigned a greater edge weight $e_i$ than edges connecting paragraphs having a lesser headline congruency. In some embodiments, the feature propagation model 315 iteratively applies a feature propagation algorithm on the graph to propagate the node features (i.e. hidden states) into neighboring nodes of the graph according to the graph structure, which includes edges between nodes defining edge weights. In some embodiments, the feature propagation algorithm is a graph convolutional network (GCN) aggregation function, for example:

$$z_i^{(k)} = \sum_{j \in N(i) \cup \{i\}} \frac{e_{ij}}{\sqrt{d_i d_j}} h_j^{(k)} \quad (2)$$

where $z_i^{(k)}$ is information propagated to the i-th node from the corresponding set of neighbor nodes $\mathcal{N}(i)$, $e_{ij}$ is the edge weight, and $\bar{d}_i$ is the degree of the i-th node in the augmented graph including self-loops. The edge weights for self-loops $e_{ii}$ are set to 1. After feature aggregation, a non-linear transformation is applied to the resulted output as follows:

$$h_i^{(k+1)} = \text{ReLu}(W_G^{(k)} z_i^{(k)} + b_G^{(k)}) \tag{3}$$

where $W_G^{(k)}$ and $b_G^{(k)}$ are trainable weights. The graph propagation layer is iterated for k times with residual connections. An illustration of a graph representing an electronic document 120 is depicted in FIG. 8.

The incongruity prediction model 320 determines a headline incongruence prediction 326 for each of the P paragraphs of the electronic document 120 based on the headline node features and paragraph node features of the graph as updated by the feature propagation model. The incongruity prediction model determines an overall headline incongruence prediction 122 for the electronic document 120 based on the headline incongruence predictions 326 for each of the P paragraphs of the electronic document 120. For example, the incongruity prediction model determines the overall headline incongruence prediction 122 for the electronic document 120 as a function of the headline incongruence predictions 326 associated with the P paragraphs of the electronic document 120. For example, the function may be a mean, a weighted mean, a mode, a median, or maximum, a minimum, an if/then or other conditional function, or other function of the headline incongruence predictions 326 associated with the P paragraphs of the electronic document 120. In some examples, the incongruity prediction model 320 includes one or more of global-local fusion (GLF) layers (e.g. GLF layer 324), fully connected (FC) layers (e.g. FC layers 321, 322, 323), bilinear operations 325, or other suitable neural network architecture, as described herein (e.g. as illustrated in FIG. 3). For example, the node embedding outputs of the graph (e.g. the updated hidden states) are passed through an FC layer 321. The FC layer 321 generates an output from an input (updated hidden states) as follows: $x_{output} = \sigma(x_{input} W + b)$, where W is a trainable weight and b is a bias term, where $W = \mathbb{R}^{input\_dim \times input\_dim}$.

The GLF layer 324 concatenates each node embedding with max-pooled and sum-pooled representations of the node embeddings in the graph. For example, the input to the GLF layer 324 is the headline vector $h_{head}^{(k)}$ after the feature propagation step and FC layer 321 and paragraph vectors $h_1^{(k)}, h_1^{(k)}, \ldots, h_{|P|}^{(k)}$ after the feature propagation step and FC layer 321. The GLF layer 324 determines an element-wise average among all the headline and paragraph vectors $x_{mean} = \text{average}(h_{head}^{(k)}, h_1^{(k)}, h_2^{(k)}, \ldots, h_{|P|}^{(k)})$ and an element wise maximum among all the headline and paragraph vectors $x_{max} = \text{average}(h_{head}^{(k)}, h_1^{(k)}, h_2^{(k)}, \ldots, h_{|P|}^{(k)})$. Output node embeddings of the GLF layer 324 include a concatenated headline vector, $h_{head}^{new} = \text{concat}(h_{head}^{(k)}, x_{mean}, x_{max})$ and concatenated paragraph vectors:

$h_1^{new} = \text{concat}(h_1^{(k)}, x_{mean}, x_{max})$,
$h_2^{new} = \text{concat}(h_2^{(k)}, x_{mean}, x_{max})$, . . . .
$h_{|P|}^{new} = \text{concat}(h_1^{(k)}, x_{mean}, x_{max})$, The output node embeddings of the GLF layer 324 are passed through FC layers 322 and 323 to compute a headline representation $v_{head}$ and paragraph representations $\{v_1, \ldots, v_P\}$. The FC layer 323 generates an output from an input (output of GLF layer 324) as follows: $x_{output} = \sigma(x_{input} W + b)$, where W is a trainable weight and b is a bias term, where $W = \mathbb{R}^{3*input\_dim \times input\_dim}$. The FC layer 325 generates an output from an input (output of FC layer 322) as follows: $x_{output} = \sigma(x_{input} W + b)$, where W is a trainable weight and b is a bias term, where $W = \mathbb{R}^{input\_dim \times input\_dim}$.

Using a bilinear operation, the incongruity prediction model 320 determines a paragraph-specific headline incongruence prediction 326 for each paragraph i of the P paragraphs. In some embodiments, the bilinear operation receives, as input, a headline vector $h_{head}$ and paragraph vectors $h_1^{(k)}, h_2^{(k)}, \ldots, h_{|P|}^{(k)}$ output by the FC layer 323 and outputs $h_{head}^T W h_1 + b$, $(h_{head})^T W h_2 + b, \ldots, (h_{head})^T W h_{|P|} + b$. From each of these outputs, a paragraph-specific headline incongruence prediction 326 is determined as follows:

$$\hat{y}_i = \sigma(v_{head}^T W_B v_i + b_B) \tag{4}$$

where $\hat{y}_i$ is the paragraph-specific headline incongruence prediction 326 for paragraph i of the P paragraphs, σ is a sigmoid linear activation function, $W_B$ and $b_B$ are learned model parameters, $v_{head}$ is the updated headline representation, and $v_i$ is the updated representation for the paragraph i.

In some embodiments, the incongruity prediction model 320 determines the overall headline incongruence prediction 122 based on the determined paragraph-specific headline incongruence predictions 326. For example, the incongruity prediction model 320 determines the overall headline incongruence prediction 122 as a function of the determined paragraph-specific headline incongruence predictions 326. The function to determine the overall headline incongruence prediction 122 may include a mean, weighted mean, median, mode, maximum, minimum, or other function. For example, the function could be:

$$\hat{y} = \max\{\hat{y}_1, \ldots, \hat{y}_{|P|}\} \tag{5}$$

a maximum of a set of the paragraph-specific headline incongruence predictions 326 for the P paragraphs of the electronic document 120.

FIG. 4 depicts an illustration of example headline-incongruent electronic documents, in accordance with certain embodiments described herein. FIG. 4 depicts a headline-incongruent electronic document 401 and a headline-incongruent electronic document 402. The headline-incongruent electronic document 401 exhibits a type of headline incongruence called partial representation. In partial representation, the headline makes claims that only partly represent a story recited in the body text. An electronic document with partial representation headline incongruence may introduce multiple stories in the body text, where the headline only describes one of the multiple stories and fails to cover the multiple stories embodied in the body text. For example, in electronic document 401, the stories of the body text include "Extreme Weather in South Florida," "Garden Club Event Canceled," and "Alleged Bigfoot Sighting in Brazil," however, the title "Extreme Weather Hits South Florida Coast" is only similar to the story "Extreme Weather in South Florida" and does not correspond to the other two stories depicted in the electronic document 401. In certain embodiments, the incongruent headline detection system 102 can predict, by applying the headline incongruence detection model 109, a headline incongruence prediction 122 for an electronic document 120 exhibiting partial representation. In these embodiments, the headline incongruence prediction 122 for the electronic document 120 exhibiting partial representation indicates that the electronic document 120 is headline-incongruent.

The headline-incongruent electronic document 402 exhibits a type of headline incongruence called incorrect representation. In incorrect representation, the headline is distinct or otherwise different from the body text of the electronic document. An electronic document with incorrect representation headline incongruence may promise to provide specific information, yet the body text does not provide the specific information promised by the headline. For example, in electronic document 402, the headline is "Why We Should All Be Eating More Turkey," however the body text, though the first paragraph describes why one should be eating more turkey, the rest of the body text is directed to a recipe for preparing a turkey dish, which is not related to the information promised by the headline of the electronic document 402 (i.e. arguments in favor of eating more turkey). In certain embodiments, the incongruent headline detection system 102 can predict, by applying the headline incongruence detection model 109, a headline incongruence prediction 122 for an electronic document 120 exhibiting incorrect representation. In these embodiments, the headline incongruence prediction 122 for the electronic document 120 exhibiting incorrect representation indicates that the electronic document 120 is headline-incongruent.

Figure 5:
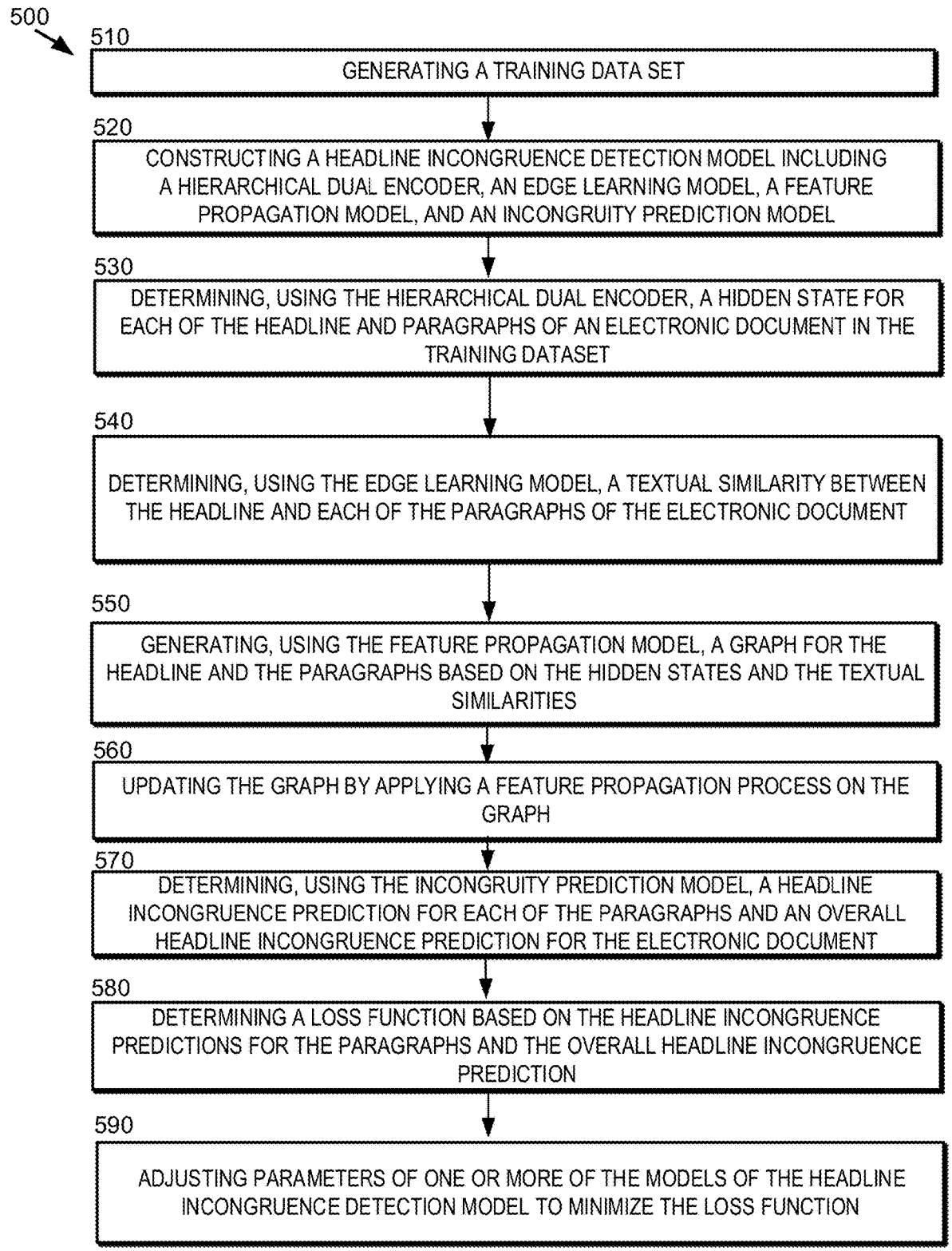
FIG. 5 depicts an example of a process for training a headline incongruence detection model, according to certain embodiments disclosed herein.

FIG. 5 depicts an example of a process 500 for training the headline incongruence detection model 109 of FIG. 1 (e.g. as illustrated in FIG. 3) for performing the process described in FIG. 2 of determining a headline incongruence prediction 122 for an electronic document 120. One or more computing devices (e.g., the incongruent headline detection system 102 or the individual modules contained therein) implement operations depicted in FIG. 5. For illustrative purposes, the process 500 is described with reference to certain examples depicted in the figures. Other implementations, however, are possible.

At block 510, the method 500 involves generating, by the training data generator module 107, a training data set 114. The training data set 114 includes a set of headline-incongruent documents and headline-congruent documents. The training data generator module 107 may generate the set of headline-incongruent documents based on a set of headline-congruent documents (e.g. from a document data set 112). In an example, to generate a headline-incongruent document, the training data generator module 107 retrieves a first headline-congruent document. The first headline-congruent document has a headline and paragraphs. The training data generator module 107 retrieves a second headline-congruent document that has a headline and paragraphs. The training data generator module 107 replaces, in the first headline-congruent document, one or more paragraphs with one or more paragraphs from the second headline-congruent document. In this example, the headline-incongruent document includes the original headline of the first headline-congruent document, one or more paragraphs of the second headline-congruent document that replaced paragraphs of the first-headline congruent document, and remaining paragraphs of the first headline-congruent document that were not replaced with paragraphs from the second headline-congruent document. In some instances, the training data includes the set of headline-congruent documents and the generated set of headline-incongruent documents. In some instances, the training data set 114 includes the set of headline-congruent documents and the generated set of headline-incongruent documents. A method for generating the training data set 114 is described in further detail herein in FIG. 6.

At block 520, the method 500 involves constructing, by the training module 108, a headline incongruence model 109 including a hierarchical dual encoder 305, an edge learning model 310, a feature propagation model 315, and an incongruity prediction model 320. An example architecture of the headline incongruence model 109 is described in FIG. 3.

At block 530, the method 500 involves the training module 108 determining, using the hierarchical dual encoder 305, a hidden state for each of the headline and paragraphs of an electronic document 120 in the training data set 114. The hierarchical dual encoder 305 determines, for each of the headline and the P paragraphs of the electronic document 120, a respective hidden state. In some instances, the hierarchical dual encoder 305 applies one or more recurrent neural networks (RNNs) to headline text and texts of each of the plurality of the P paragraphs, which are input to the RNN as word sequences, to determine the hidden states. In some embodiments a Headline RNN determines a headline hidden state, based on the headline text of the electronic document 120 and a Paragraph RNN determines paragraph hidden states for each of the P paragraphs of the electronic document 120. In some embodiments, the Headline RNN includes a gated-recurrent-unit-based (GRU-based) bidirectional RNN to which word sequences for the headline is input to encode the input into a fixed-size vector. Based on the input word sequences for the headline, the GRU-based bidirectional Headline RNN outputs a respective final hidden state for the headline. In some embodiments, the Paragraph RNN includes a GRU-based bidirectional RNN to which world-level representations 307 (word sequences) for each of the P paragraphs are input to determine a last hidden state of the GRU-based bidirectional RNN as a paragraph-level representation 309 of each paragraph. The GRU-based bidirectional RNN then learns the paragraph representation from the first level of the GRU-based bidirectional RNN and the context-aware paragraph-level representations 309.

At block 540, the method 500 involves determining, by the training module 108 using the edge learning model 310, a textual similarity between the headline and each of the P paragraphs of the electronic document 120. The edge learning model 310 determines edge weights between the headline and each of the P paragraphs, the edge weights representing a textual similarity between the headline and each of the P paragraphs. In an embodiment, each respective edge weight is determined as a function of the representations, as determined by the hierarchical dual node encoder 305, of the headline and the respective paragraph. In this embodiment, the function may be a bilinear operation with sigmoid nonlinearity, for example, as described previously in Equation 1. The use of a sigmoid function bounds the edge weight to a value between zero and one. In some embodiments, edges including paragraphs having a greater headline congruency are assigned a greater edge weight than paragraphs having a lesser headline congruency.

At block 550, the method 500 involves the training module 108 generating using the feature propagation model 315, a graph for the headline and the paragraphs based on the hidden states and the textual similarities. The feature propagation model 315 generates a graph for the headline and the P paragraphs of the electronic document 120 based on the representations (hidden states) of the headline and the P paragraphs. The graph is an undirected graph G=(V, E) for the electronic document 120 that represents its innate structure, where V are nodes comprising the headline and each paragraph of the P paragraphs of the electronic document 120 and E are edges formed between the headline and each paragraph of the P paragraphs of the electronic document, resulting in a total of E=P edges. The graph includes a headline node associated with the headline of the electronic document 120, P paragraph nodes associated with the P paragraphs of the electronic document 120, and edges connecting the headline node to each paragraph node of the graph. The feature propagation model 315 assigns, to each edge connecting the headline node to a respective paragraph node, the edge weight determined by the edge learning model 310 that represents the textual similarity between the respective paragraph associated with the respective paragraph node and the headline associated with the headline node.

At block 560, the method 500 involves updating, by the training module 108, the graph by applying a feature propagation process on the graph. In some embodiments, the feature propagation model 315 iteratively applies a feature propagation algorithm on the graph to propagate the node features (i.e. hidden states) into neighboring nodes of the graph according to the graph structure, which includes edges between nodes defining edge weights. In some embodiments, the feature propagation algorithm is a graph convolutional network (GCN) aggregation function, for example, Equation 2 as described previously. In some embodiments, after feature aggregation, a non-linear transformation is applied to the resulted output as described in Equation 3 as described previously. The graph propagation layer is iterated for k times with residual connections. An illustration of a graph representing an electronic document 120 is depicted in FIG. 8.

At block 570, the method 500 involves determining, by the training module 108 using the incongruity prediction model 320, a headline incongruence prediction 326 for each of the paragraphs and an overall headline incongruence prediction 122 for the electronic document 120. The incongruity prediction model 320 determines an overall headline incongruence prediction 122 for the electronic document 120 based on the headline incongruence predictions 326 for each of the P paragraphs of the electronic document 120. For example, the incongruity prediction model determines the overall headline incongruence prediction 122 for the electronic document 120 as a function of the headline incongruence predictions 326 associated with the P paragraphs of the electronic document 120. For example, the function may be a mean, a weighted mean, a mode, a median, or maximum, a minimum, an if/then or other conditional function, or other function of the headline incongruence predictions 326 associated with the P paragraphs of the electronic document 120.

In some examples, the incongruity prediction model 320 includes one or more of a GLF layer, FC layers, bilinear operationsm, or other suitable neural network architecture, as described herein (e.g. as illustrated in FIG. 3). For example, the node embedding outputs of the graph (e.g. the updated hidden states) are passed through a FC layer. A GLF layer concatenates each node embedding with max-pooled and sum-pooled representations of the node embeddings in the graph. Output node embeddings of the GLF layer are passed through two FC layers to compute a headline representation and paragraph representations. Using a bilinear operation, the incongruity prediction model 320 determines a paragraph-specific headline incongruence prediction 326 for each paragraph i of the P paragraphs using a bilinear operation, for example, the bilinear operation described previously in Equation 4. In some embodiments, the incongruity prediction model 320 determines the overall headline incongruence prediction 122 based on the determined paragraph-specific headline incongruence predictions 326. For example, the incongruity prediction model 320 determines the overall headline incongruence prediction 122 as a function of the determined paragraph-specific headline incongruence predictions 326. The function to determine the overall headline incongruence prediction 122 may include a mean, weighted mean, median, mode, maximum, minimum, or other function. For example, the function could be a maximum of a set of the paragraph-specific headline incongruence predictions 326 for the P paragraphs of the electronic document 120, as described previously in Equation 5.

At block 580, the method 500 involves determining, by the training module 108, a loss function based on the headline incongruence predictions 326 for the paragraphs and the overall headline incongruence prediction 122. In some embodiments, the loss function for the overall headline incongruence prediction 122 for the electronic document 120 is:

$$\mathcal{L}_{document} = CE(\hat{y}, y) \qquad (6)$$

where CE is a cross-entropy loss between the overall headline incongruence prediction 122, represented by $\hat{y}$ and a ground truth headline incongruence label for the electronic document 120, represented by y.

In some embodiments, the training module 108 determines an edge loss function as one of the following:

$$\mathcal{L}_{edge} = -\sum_i (1 - y_i) \log(e_i) + y_i \log(1 - e_i) \qquad (7)$$

$$\mathcal{L}_{edge} = -\sum_{i=1}^{|P|} CE(e_i, 1 - y_i) \qquad (8)$$

where y is the incongruity label of the input electronic document 120, CE is the cross-entropy loss. Using the edge loss function causes edges of headline-congruent paragraphs (e.g. those that correspond to the title based on textual similarity) of the electronic document 120 to be retained, while causing the edges of headline-incongruent paragraphs to be masked.

In some embodiments, the training module 108 determines a combined loss function $\mathcal{L}_{combined}$ based on the loss function for the headline incongruence prediction 122, $\mathcal{L}_{document}$ and the edge loss function $\mathcal{L}_{edge}$:

$$\mathcal{L}_{combined} = \mathcal{L}_{document} + \lambda \mathcal{L}_{edge} \qquad (9)$$

where $\lambda$ is a hyperparameter for adjusting a tradeoff between the component loss functions.

At block 590, the method 500 involves adjusting, by the training module 108, parameters of one or more of the models 305, 310, 315, and/or 320 of the headline incongruence detection model 109 to minimize the loss function. For example, the training module 108 adjusts parameters to minimize the combined loss function. Example parameters include the trainable weights for determining an edge weight (Equation 1), trainable weights for the linear transformation (Equation 3) of the feature propagation step, learned model parameters of the bilinear operation (Equation 4) of the headline-incongruity prediction step, and the hyperparameter used in determining the combined loss function (Equation 8). Blocks 520-590 can be repeated until the loss function is minimized.

Figure 6:
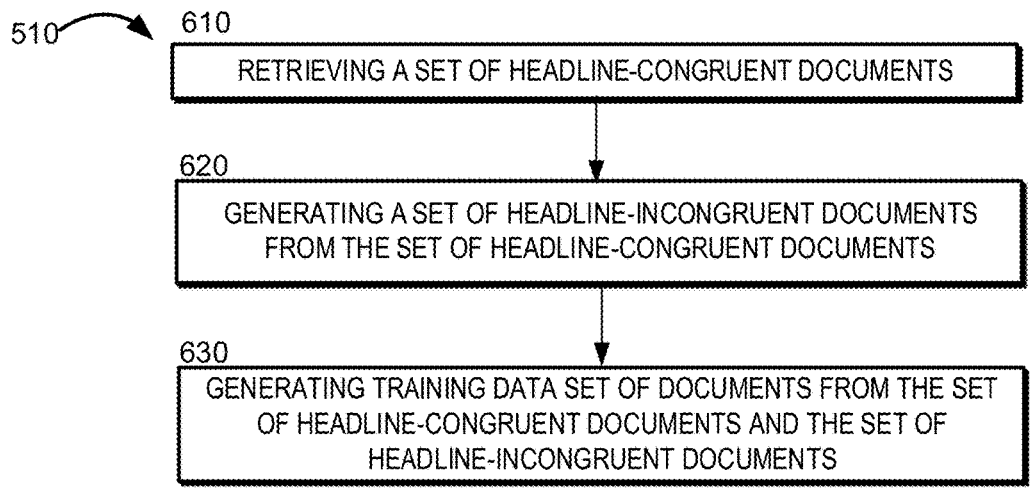
FIG. 6 depicts an example of a process for generating training data for training a headline incongruence detection model, according to certain embodiments disclosed herein.

FIG. 6 depicts an example of a process 600 for generating a training data set 114. Process 600 can be used implement block 510 of process 500 described in FIG. 5. One or more computing devices (e.g., the incongruent headline detection system 102 or the individual modules contained therein) implement operations depicted in FIG. 6. For illustrative purposes, the process 600 is described with reference to certain examples depicted in the figures. Other implementations, however, are possible.

At block 610, the process 600 involves retrieving, by the training data generator module 107, a set of headline-congruent documents. The training data generator module 107 may generate a set of headline-incongruent documents based on the retrieved set of headline-congruent documents (e.g. from a document data set 112). In certain embodiments, the document data set 112 includes a collection of electronic documents 120 known to exhibit headline congruence. For example, the document data set 112 could be a database of news articles from one or more reputable news publishers.

At block 620, the process 600 involves generating, by the training data generator module 107, a set of headline-incongruent documents from the set of headline-congruent documents. In an example, to generate a headline-incongruent document, the training data generator module 107 retrieves a first headline-congruent document. The first headline-congruent document has a headline and paragraphs. The training data generator module 107 retrieves a second headline-congruent document that has a headline and paragraphs. The training data generator module 107 replaces, in the first headline-congruent document, one or more paragraphs with one or more paragraphs from the second headline-congruent document. In this example, the headline-incongruent document includes the original headline of the first headline-congruent document, one or more paragraphs of the second headline-congruent document that replaced paragraphs of the first-headline congruent document, and remaining paragraphs of the first headline-congruent document that were not replaced with paragraphs from the second headline-congruent document. In some instances, the training data includes the set of headline-congruent documents and the generated set of headline-incongruent documents. In some instances, the training data set 114 includes the set of headline-congruent documents and the generated set of headline-incongruent documents. In some instances, the training data includes the set of headline-congruent documents and the generated set of headline-incongruent documents. For example, the training data generator module 107 replaces a portion of a body text of a first target news article from the document data set 112 with a portion of a body text of a second target news article from the document data set 112.

Figure 7:
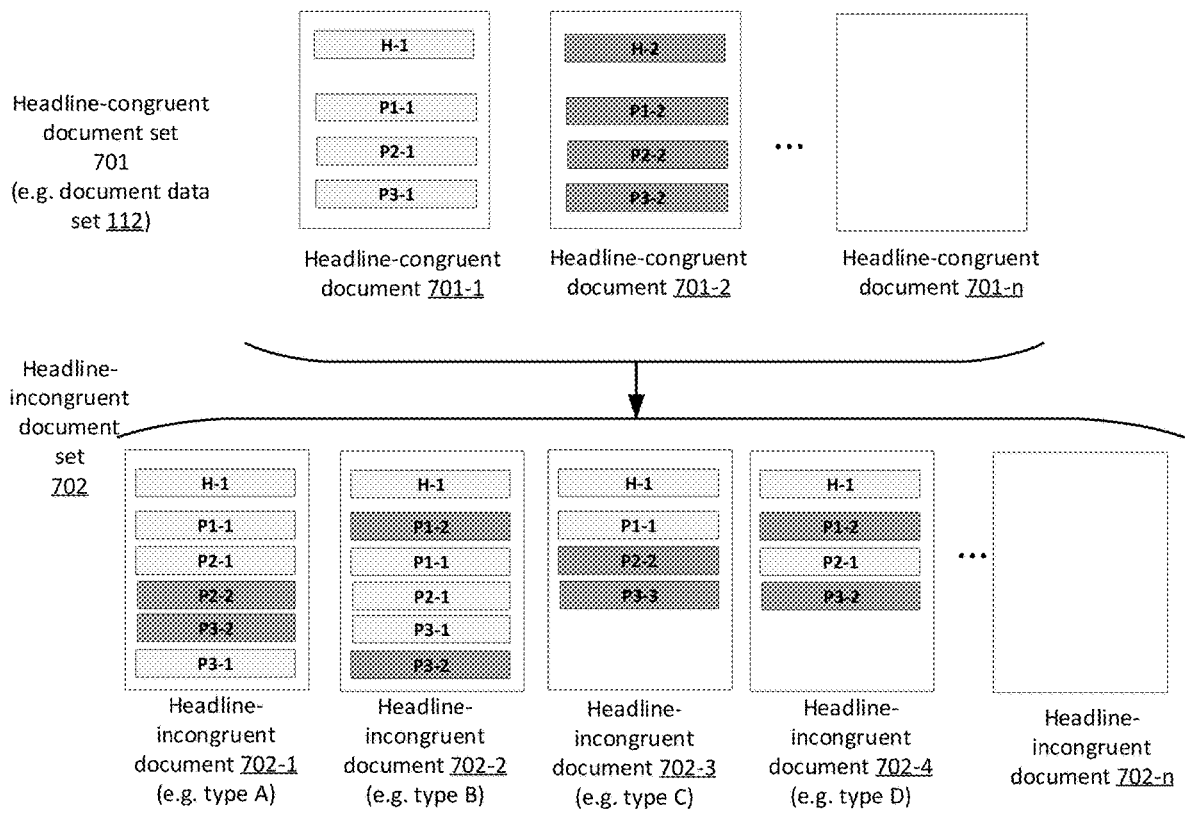
FIG. 7 depicts an example illustration of generating training data from a set of headline-congruent documents, according to certain embodiments disclosed herein.

At block 630, the process 600 involves generating, by the training data generator module 107, a training data set 114 of documents from the set of headline-congruent documents and the set of headline-incongruent documents. For example, the training data generator module 107 selects unmodified electronic documents from the document data set 112 and headline-incongruent documents generated by the training data generator module 107. FIG. 7 depicts an illustration of generation of a training data set 114 from a document data set 112.

FIG. 7 depicts an illustration of generation of headline-incongruent documents for a training data set 114 from headline-congruent documents of a document data set 112. As depicted in FIG. 7, a headline-congruent document set 701 (e.g. a document data set 112) includes n headline-congruent electronic documents 701-1, 701-2, . . . , 701-*n*. As depicted in FIG. 7, a headline-incongruent document set 702 including n headline-incongruent documents 702-1, 702-2, 702-3, 702-4, . . . , 702-*n* that are generated from the headline-congruent document set 701. As depicted in FIG. 7, portions of two headline-congruent document 701-1 (which includes headline H-1 and paragraphs P1-1, P2-1, and P3-1) and 702-2 (which includes headline H-2 and paragraphs P2-1, P2-2, and P2-3) are mixed to generate headline-incongruent documents 702-1, 702-2, 702-3, and 702-4.

For example, the headline H-1 of headline-congruent document 701-1 is used to generate each of the headline-incongruent documents 702-1, 702-2, 702-3, and 702-4. In some embodiments, headline-incongruent document 702-1 (e.g. type A) is generated by inserting paragraphs P2-2 and P3-3 between paragraphs P2-1 and P3-1 of headline congruent document 702-1. In some embodiments, headline-incongruent document 702-2 (e.g. type B) is generated by inserting paragraph P1-2 from headline-congruent document 701-2 before paragraphs P1-1, P2-1, and P3-1 of headline congruent document 701-1 and inserting paragraph P3-2 from the headline-congruent document 701-2 after paragraphs P1-1, P2-1, and P3-1. In some embodiments, headline-incongruent document 702-3 (e.g. type C) is generated by replacing paragraphs P1-2 and P1-3 of headline-congruent document 701-1 with paragraphs P2-2 and P2-3 with headline-congruent document 701-2 of headline-congruent document 701-2. In some embodiments, headline-incongruent document 702-4 (e.g. type D) is generated by replacing paragraph P2-1 of headline-congruent document 701-1 with paragraph P2-1 of headline-congruent document 701-2. In certain embodiments, the training data generator module generates n headline-incongruent documents from the n headline-congruent documents. In certain embodiments, the training data set 114 includes the n headline-incongruent documents and the n headline-congruent documents.

FIG. 8 depicts an illustration of generating a graph representing an electronic document for use in the processes described in FIGS. 2-3 and 5 herein. As depicted in FIG. 8, a graph 801 is generated to represent a headline H and paragraphs P1, P2, and P3 of electronic document 401, which was discussed previously in FIG. 4. As shown in graph 801, the headline node H, representing the title of the article "Extreme Weather Hits South Florida Coast," is connected to each of paragraph nodes P1, representing the paragraph "Extreme weather . . . ," P2, representing the paragraph "Garden Club . . . ," and P2, representing the paragraph "Alleged Bigfoot Sighting . . . "

Examples of Computing Environments for
Implementing Certain Embodiments

Figure 9:
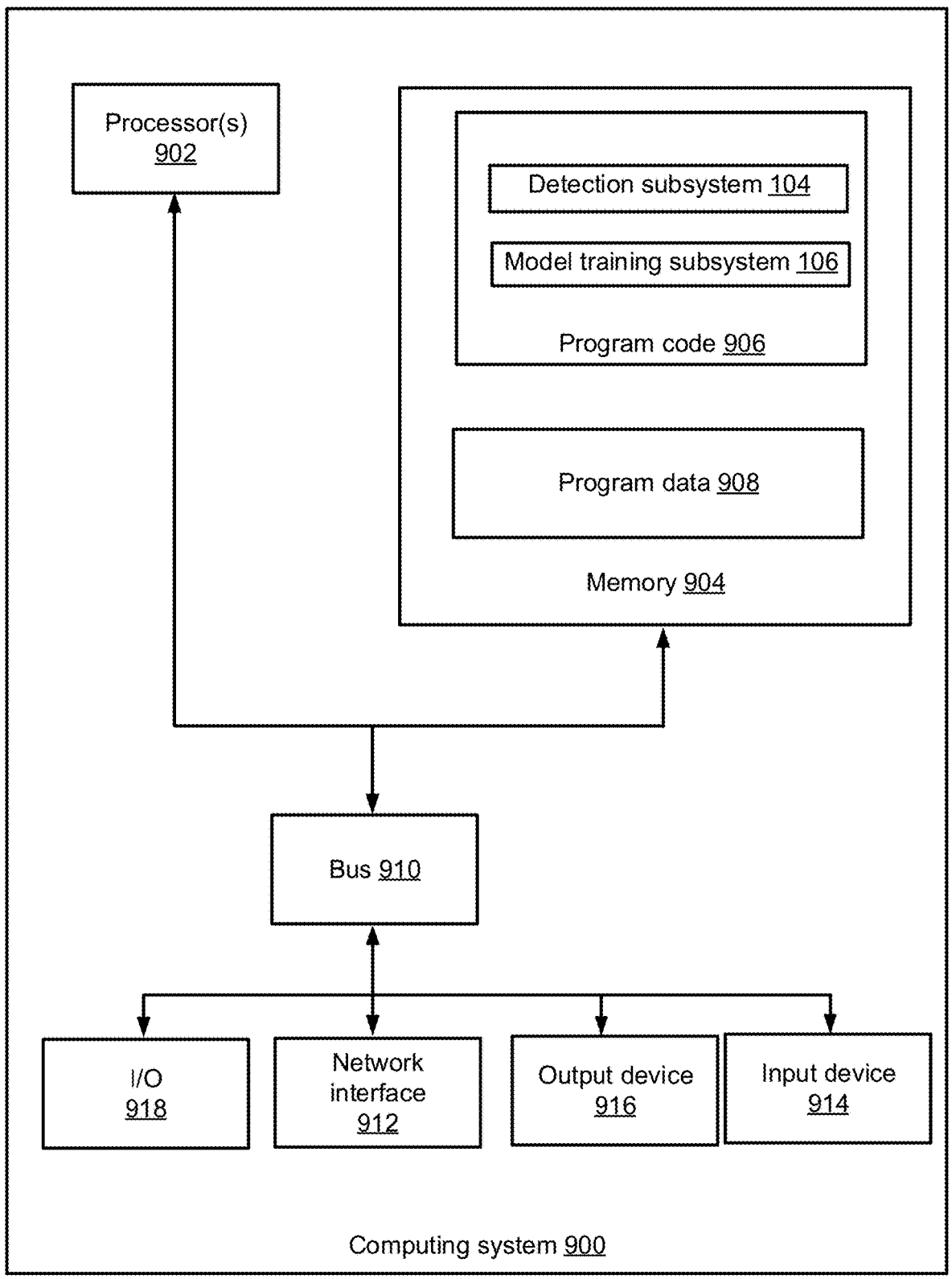
FIG. 9 depicts an example of a computing system that performs certain operations described herein, according to certain embodiments described in the present disclosure.

Any suitable computer system or group of computer systems can be used for performing the operations described herein. For example, FIG. 9 depicts an example of a computer system 900. The depicted example of the computer system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing program code 906, program data 908, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 404 can be volatile memory, non-volatile memory, or a combination thereof.

The computer system 900 executes program code 906 that configures the processor 902 to perform one or more of the operations described herein. Examples of the program code 906 include, in various embodiments, the detection subsystem 104 and the model training subsystem 106 of FIG. 1, which may include any other suitable systems or subsystems that perform one or more operations described herein (e.g., one or more neural networks, encoders, attention propagation subsystem and segmentation subsystem). The program code 906 may be resident in the memory device 904 or any suitable computer-readable medium and may be executed by the processor 902 or any other suitable processor.

The processor 902 is an integrated circuit device that can execute the program code 906. The program code 906 can be for executing an operating system, an application system or subsystem, or both. When executed by the processor 902, the instructions cause the processor 902 to perform operations of the program code 906. When being executed by the processor 902, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 904 store the program data 908 that includes one or more datasets described herein. In some embodiments, one or more of data sets are stored in the same memory device (e.g., one of the memory devices 904). In additional or alternative embodiments, one or more of the programs, data sets, models, and functions described herein are stored in different memory devices 904 accessible via a data network. One or more buses 910 are also included in the computer system 900. The buses 910 communicatively couple one or more components of a respective one of the computer system 900.

In some embodiments, the computer system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computer system 900 is able to communicate with one or more other computing devices via a data network using the network interface device 912.

The computer system 900 may also include a number of external or internal devices, an input device 914, a presentation device 916, or other input or output devices. For example, the computer system 900 is shown with one or more input/output ("I/O") interfaces 918. An I/O interface 918 can receive input from input devices or provide output to output devices. An input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. A presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computer system 900, other implementations are possible. For instance, in some embodiments, one or more of the input device 914 and the presentation device 916 can include a remote client-computing device that communicates with computing system 900 via the network interface device 912 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 10:
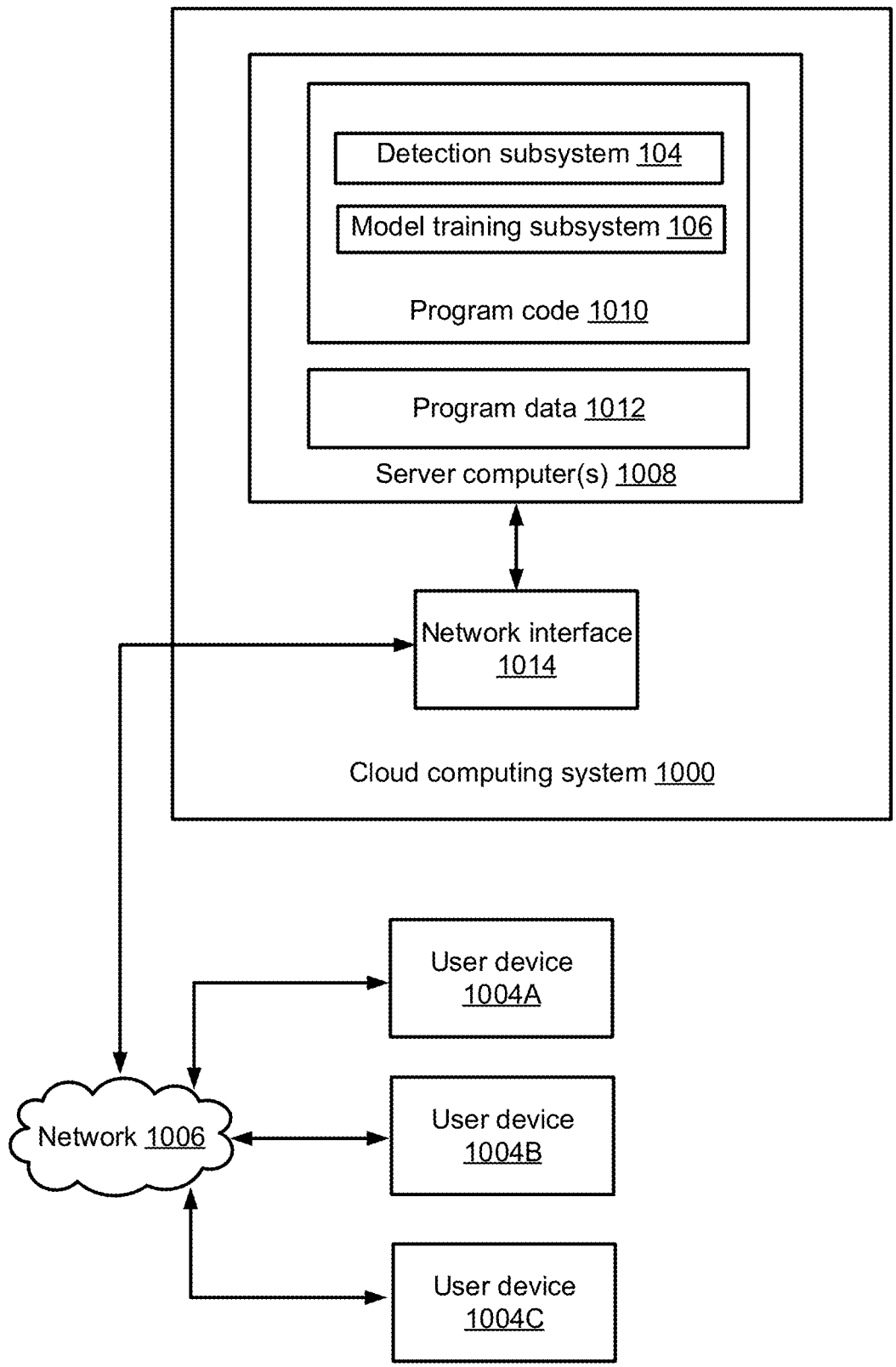
FIG. 10 an example of a cloud computing system that performs certain operations described herein, according to certain embodiments described in the present disclosure.

In some embodiments, the functionality provided by computer system 900 may be offered as cloud services by a cloud service provider. For example, FIG. 10 depicts an example of a cloud computer system 1000 offering a service for generating a headline-incongruence prediction 122 for an electronic document 120 that can be used by a number of user subscribers using user devices 1004A, 1004B, and 1004C across a data network 1006. In the example, the service for generating a headline incongruence prediction 122 for an electronic document 120 may be offered under a Software as a Service (SaaS) model. One or more users may subscribe to the service for generating a headline incongruence prediction 122 for an electronic document 120, and the cloud computer system 800 performs the processing to provide the service for generating a headline incongruence prediction 122 for an electronic document 120 to subscribers. The cloud computer system 1000 may include one or more remote server computers 1008.

The remote server computers 1008 include any suitable non-transitory computer-readable medium for storing program code 1010 (e.g., the detection subsystem 104 and the model training subsystem 106 of FIG. 1) and program data 1012, or both, which is used by the cloud computer system 1000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 508 can include volatile memory, non volatile memory, or a combination thereof.

One or more of the server computers 1008 execute the program code 1010 that configures one or more processors of the server computers 1008 to perform one or more of the operations that provide video frame segmenting services, including the ability to perform both fast and accurate video semantic segmentation using a set of temporally distributed neural networks. As depicted in the embodiment in FIG. 10, the one or more servers providing the services to generate a headline incongruence prediction 122 for an electronic document 120 may implement the detection subsystem 104 and the model training subsystem 106. Any other suitable systems or subsystems that perform one or more operations described herein (e.g., one or more development systems for configuring an interactive user interface) can also be implemented by the cloud computer system 1000.

In certain embodiments, the cloud computer system 1000 may implement the services by executing program code and/or using program data 1012, which may be resident in a memory device of the server computers 1008 or any suitable computer-readable medium and may be executed by the processors of the server computers 1008 or any other suitable processor.

In some embodiments, the program data 1012 includes one or more datasets and models described herein. Examples of these datasets include segmented video frames. In some embodiments, one or more of data sets, models, and functions are stored in the same memory device. In additional or alternative embodiments, one or more of the programs, data sets, models, and functions described herein are stored in different memory devices accessible via the data network 1006.

The cloud computer system 1000 also includes a network interface device 1014 that enable communications to and from cloud computer system 1000. In certain embodiments, the network interface device 1014 includes any device or group of devices suitable for establishing a wired or wireless data connection to the data networks 1006. Non-limiting examples of the network interface device 1014 include an Ethernet network adapter, a modem, and/or the like. The next event prediction and dynamic clustering service is able to communicate with the user devices 1004A, 1004B, and 1004C via the data network 1006 using the network interface device 1014.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   receiving, by a processing device, a request to determine a headline incongruence score for an electronic document;
   determining, by the processing device, the headline incongruence score for the electronic document by applying a machine learning model to the electronic document, wherein applying the machine learning model to the electronic document comprises generating a graph representing a textual similarity between a headline of the electronic document and each of a plurality of paragraphs of the electronic document and determining the headline incongruence score based on the graph; and
   transmitting, by the processing device, responsive to the request, the headline incongruence score for the electronic document.

2. The method of claim 1, wherein applying the machine learning model to the electronic document further comprises:
   determining a hidden state for each of the headline and the plurality of paragraphs of the electronic document;
   determining a textual similarity between the headline and each of the plurality of paragraphs; and
   generating the graph based on the determined hidden states and the textual similarities, the graph including a headline node representing the headline, the headline node connected to each of a plurality of paragraph nodes representing the plurality of paragraphs.

3. The method of claim 2, wherein determining the hidden state for each of the headline and the plurality of paragraphs of the electronic document comprises applying a neural network to word sequences in each of the headline and the plurality of paragraphs.

4. The method of claim 2, wherein applying the machine learning model to the electronic document further comprises:
   updating the hidden state for each of the headline and the plurality of paragraphs by iteratively applying a feature propagation algorithm on the graph; and
   determining the headline incongruence score based on the updated hidden states.

5. The method of claim 4, wherein determining the headline incongruence score based on the updated hidden states comprises:
   determining, based on the updated hidden states, a paragraph-level headline incongruence score for each of the plurality of paragraphs of the electronic document; and
   determining the headline incongruence score for the electronic document based on the paragraph-level headline incongruence scores.

6. The method of claim 5, wherein determining the headline incongruence score comprises determining a maximum score among the paragraph-level headline incongruence scores.

7. The method of claim 2, wherein generating the graph comprises:
   assigning the hidden state of the headline to the headline node;
   assigning the hidden states for each of the plurality of paragraphs to a respective paragraph node; and
   for each edge connecting the headline node to a respective paragraph node, assigning the determined textual similarity between the headline and a respective paragraph corresponding to the respective paragraph node.

8. The method of claim 1, wherein the machine learning model is trained using a training dataset comprising a headline-incongruent document, and wherein the headline-incongruent document is generated by mixing a headline and paragraphs of a first headline-congruent document with paragraphs of a second headline-congruent document.

9. The method of claim 1, further comprising:
   determining, by the processing device, that the headline incongruence score is greater than a threshold headline incongruence score,
   wherein, responsive to determining that the headline incongruence score is greater than the threshold headline incongruence score, transmitting instructions to display a label, via a user interface, indicating that the electronic document is headline incongruent.

10. A system comprising:
    a processing device; and
    a non-transitory computer-readable medium communicatively coupled to the processing device, the processing device to perform operations comprising:
      generating a training dataset comprising a headline-incongruent document, wherein the headline incongruent document is generated by mixing a headline and paragraphs of a first headline-congruent document with paragraphs of a second headline-congruent document; and
      training a machine learning model using the training dataset, wherein the trained machine language detection model is trained to determine a headline incongruence score for an electronic document by generating a graph representing a textual similarity between a headline of the electronic document and each of a plurality of paragraphs of the electronic document and determining the headline incongruence score using the graph.

11. The system of claim 10, wherein the trained machine learning model performs operations comprising:
    determining a hidden state for each of the headline and the plurality of paragraphs of the electronic document;
    determining a textual similarity between the headline and each of the plurality of paragraphs; and
    generating the graph based on the determined hidden states and the textual similarities, the graph including a headline node representing the headline, the headline node connected to each of a plurality of paragraph nodes representing the plurality of paragraphs.

12. The system of claim 11, wherein the trained machine learning model performs further operations comprising:
updating the hidden state for each of headline and the plurality of paragraphs by iteratively applying a feature propagation algorithm on the graph;
determining, based on the updated hidden states, a paragraph-level headline incongruence score for each of the plurality of paragraphs of the electronic document; and
determining the headline incongruence score for the electronic document based on the paragraph-level headline incongruence scores.

13. The system of claim 12, wherein determining the headline incongruence score comprises determining a maximum score among the paragraph-level headline incongruence scores.

14. The system of claim 13, wherein generating the graph comprises:
assigning the hidden state of the headline to the headline node;
assigning the hidden states for each of the plurality of paragraphs to a respective paragraph node; and
for each edge connecting the headline node to a respective paragraph node, assigning the determined textual similarity between the headline and a respective paragraph corresponding to the respective paragraph node.

15. A non-transitory computer-readable medium having instructions stored thereon that, when executed by one or more processing devices cause the one or more processing devices to perform operations comprising:
accessing an electronic document; and
determining a headline incongruence score for the electronic document by applying a machine learning model to the electronic document, wherein applying the machine learning model to the electronic document comprises generating a graph representing a textual similarity between a headline of the electronic document and each of a plurality of paragraphs of the electronic document and determining the headline incongruence score based on the graph.

16. The non-transitory computer-readable medium of claim 15, wherein applying the machine learning model to the electronic document further comprises:
determining a hidden state for each of the headline and the plurality of paragraphs of the electronic document;
determining a textual similarity between the headline and each of the plurality of paragraphs; and
generating the graph based on the determined hidden states and the textual similarities, the graph including a headline node representing the headline, the headline node connected to each of a plurality of paragraph nodes representing the plurality of paragraphs.

17. The non-transitory computer-readable medium of claim 15, wherein determining the hidden state for each of the headline and the plurality of paragraphs of the electronic document comprises applying a neural network to word sequences in each of the headline and the plurality of paragraphs.

18. The non-transitory computer-readable medium of claim 17, wherein applying the machine learning model to the electronic document further comprises:
updating the hidden state for each of the headline and the plurality of paragraphs by iteratively applying a feature propagation algorithm on the graph; and
determining the headline incongruence score based on the updated hidden states.

19. The non-transitory computer-readable medium of claim 18, wherein determining the headline incongruence score based on the updated hidden states comprises:
determining, based on the updated hidden states, a paragraph-level headline incongruence score for each of the plurality of paragraphs of the electronic document; and
determining the headline incongruence score for the electronic document based on the paragraph-level headline incongruence scores.

20. The non-transitory computer-readable medium of claim 19, wherein determining the headline incongruence score comprises determining a maximum score among the paragraph-level headline incongruence scores.

* * * * *